United States Patent
Seko

(10) Patent No.: US 12,439,994 B2
(45) Date of Patent: Oct. 14, 2025

(54) HELMET SYSTEM HAVING A REAR MOUNT FOR A CELLPHONE FOR A SADDLE RIDING VEHICLE

(71) Applicant: Honda Motor Co., Ltd., Tokyo (JP)

(72) Inventor: Shigeyuki Seko, Los Banos, CA (US)

(73) Assignee: Honda Motor Co., Ltd., Tokyo (JP)

( * ) Notice: Subject to any disclaimer, the term of this patent is extended or adjusted under 35 U.S.C. 154(b) by 361 days.

(21) Appl. No.: 18/189,007

(22) Filed: Mar. 23, 2023

(65) Prior Publication Data

US 2024/0315385 A1 Sep. 26, 2024

(51) Int. Cl.
| | |
|---|---|
| A42B 3/30 | (2006.01) |
| A42B 3/04 | (2006.01) |
| H04M 1/05 | (2006.01) |
| H04M 1/72409 | (2021.01) |
| H04M 1/60 | (2006.01) |

(52) U.S. Cl.
CPC .............. *A42B 3/30* (2013.01); *A42B 3/0453* (2013.01); *H04M 1/05* (2013.01); *H04M 1/72409* (2021.01); *H04M 1/6066* (2013.01); *H04M 2250/02* (2013.01)

(58) Field of Classification Search
CPC ................................ A42B 3/30; A42B 3/0453
See application file for complete search history.

(56) References Cited

U.S. PATENT DOCUMENTS

| | | | |
|---|---|---|---|
| 7,317,936 B2 | 1/2008 | Katayama et al. | |
| 7,907,975 B2 | 3/2011 | Sakamoto et al. | |
| 8,073,496 B2 | 12/2011 | Kim et al. | |
| 9,042,944 B2 | 5/2015 | Dieringer | |
| 10,696,212 B2 * | 6/2020 | Cook | B62K 23/06 |
| 2013/0104297 A1 * | 5/2013 | Silva | A42B 3/0453 2/422 |
| 2014/0104055 A1 * | 4/2014 | Boutte | A42B 3/0453 340/468 |
| 2014/0268376 A1 * | 9/2014 | O'Neill | G03B 17/14 359/827 |
| 2014/0273863 A1 | 9/2014 | Luizzi | |
| 2016/0309827 A1 * | 10/2016 | Dodson | A42B 3/0426 |
| 2019/0248275 A1 * | 8/2019 | Cook | B62J 6/056 |
| 2021/0312842 A1 | 10/2021 | Tashima et al. | |
| 2024/0061520 A1 * | 2/2024 | Wang | G06F 3/0386 |
| 2025/0123076 A1 * | 4/2025 | Campbell | F41G 1/545 |

FOREIGN PATENT DOCUMENTS

| | | |
|---|---|---|
| CN | 2650558 Y | 10/2004 |
| CN | 201142959 Y | 11/2008 |
| CN | 202456618 U | 10/2012 |
| CN | 209628722 U | 11/2019 |
| CN | 213188332 U | 5/2021 |

(Continued)

*Primary Examiner* — Alison Slater
(74) *Attorney, Agent, or Firm* — Joshua Freier; American Honda Motor Co., Inc.

(57) ABSTRACT

A helmet system for a saddle riding vehicle includes a helmet for a driver of the saddle riding vehicle and including a holder for retaining a mobile phone. The holder is arranged at a rear of the helmet to provide a view of a display of the mobile phone retained by the holder. Further, a control device is adapted to be held by a pillion rider of the saddle riding vehicle and is configured to facilitate the pillion rider to operate and control the mobile phone.

20 Claims, 2 Drawing Sheets

(56) References Cited

FOREIGN PATENT DOCUMENTS

| | | | |
|---|---|---|---|
| CN | 113589321 | A | 11/2021 |
| CN | 214594478 | U | 11/2021 |
| CN | 215097995 | U | 12/2021 |
| DE | 102016215729 | B4 | 7/2018 |
| EP | 3701821 | A1 | 9/2020 |
| KR | 20020017492 | A | 3/2002 |
| WO | 2020130031 | A1 | 6/2020 |
| WO | 2021124641 | A1 | 6/2021 |

* cited by examiner

HELMET SYSTEM HAVING A REAR MOUNT FOR A CELLPHONE FOR A SADDLE RIDING VEHICLE

BACKGROUND

The disclosed subject matter relates generally to a saddle riding vehicle. More particularly, the disclosed subject matter relates to a helmet system for a saddle riding vehicle.

Although mobile phones are commonly used, it is difficult for a pillion rider of a saddle riding to operate the mobile phone and view a map of the route being travelled. Moreover, the pillion rider is not able to view various curves/turns during the ride of the saddle riding vehicle to enable a posture adjustment.

SUMMARY

In accordance with one embodiment of the present disclosure, a helmet system for a saddle riding vehicle is provided. The helmet system includes a helmet for a driver of the saddle riding vehicle and including a holder for retaining a mobile phone. The holder is arranged at a rear of the helmet to provide a view of a display of the mobile phone retained by the holder. The helmet system further includes a control device adapted to be held by a pillion rider of the saddle riding vehicle and configured to facilitate the pillion rider to operate and control the mobile phone.

In accordance with one embodiment of the present disclosure, a saddle riding vehicle is disclosed. The saddle riding vehicle includes a helmet for a driver of the saddle riding vehicle and including a holder for retaining a mobile phone. The holder is arranged at a rear of the helmet to provide a view of a display of the mobile phone retained by the holder. The saddle riding vehicle also includes a pair of turn indicator lights configured to indicate a turning direction of the saddle riding vehicle. Moreover, the saddle riding vehicle includes a control device adapted to be held and operated by a pillion rider of the saddle riding vehicle. The control device is configured to facilitate the pillion rider to operate and control the mobile phone and actuate the pair of turn indicator lights.

In accordance with yet further embodiment of the present disclosure, a helmet system for a saddle riding vehicle is disclosed. The helmet system includes a helmet for a driver of the saddle riding vehicle and including a holder arranged at a rear of the helmet, and a mobile phone coupled to the holder. The helmet system further includes a control device adapted to be held by a pillion rider of the saddle riding vehicle and including a user interface having a plurality of keys to enable the pillion rider to operate and control the mobile phone.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-2 wherein like numbers indicate the same or corresponding elements throughout the views.

Figure 1:
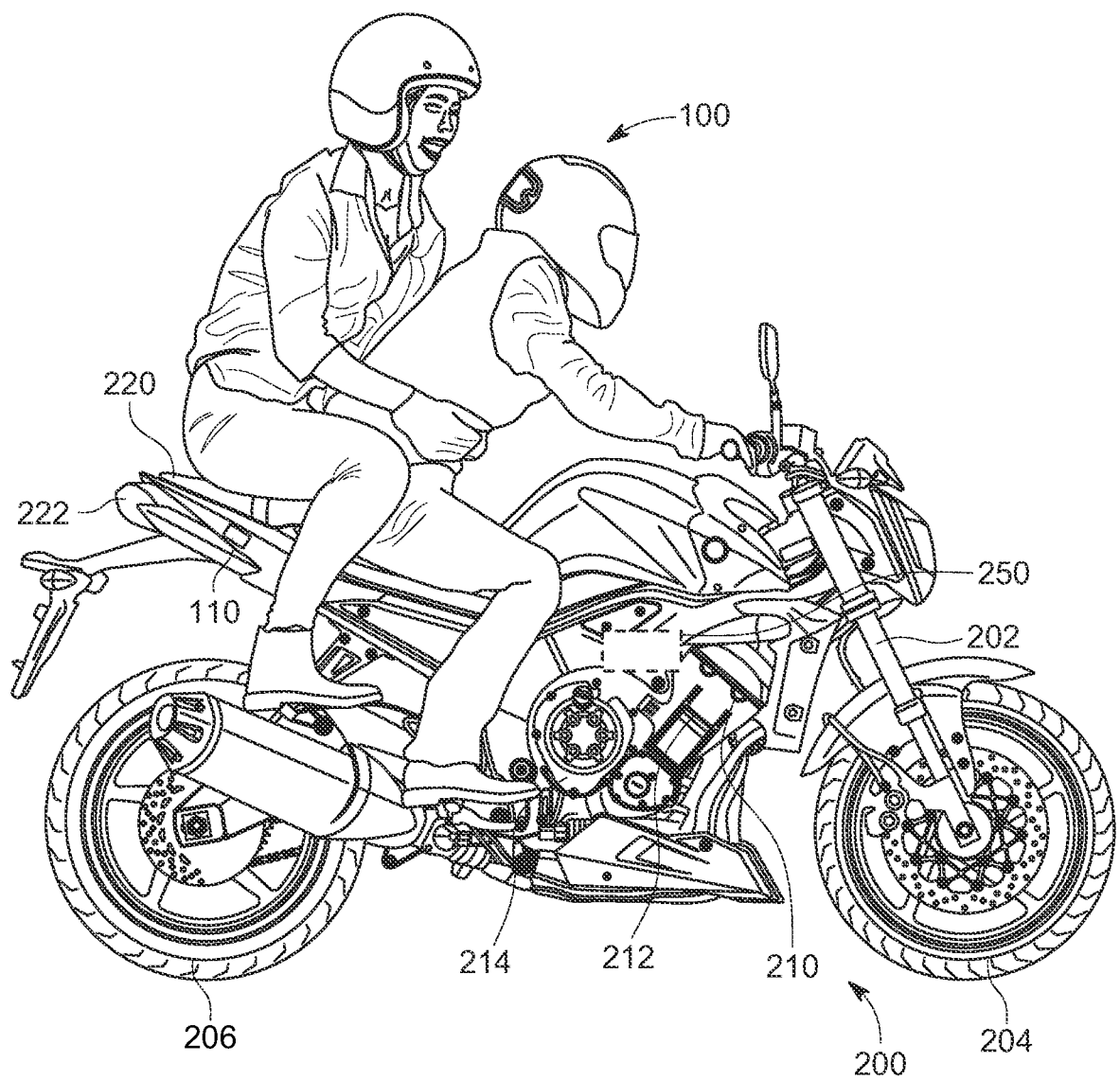
FIG. 1 is a side perspective view of a saddle riding vehicle with a helmet system having a helmet arranged over a driver of the saddle riding vehicle, in accordance with one embodiment of the present disclosure.
Figure 2:
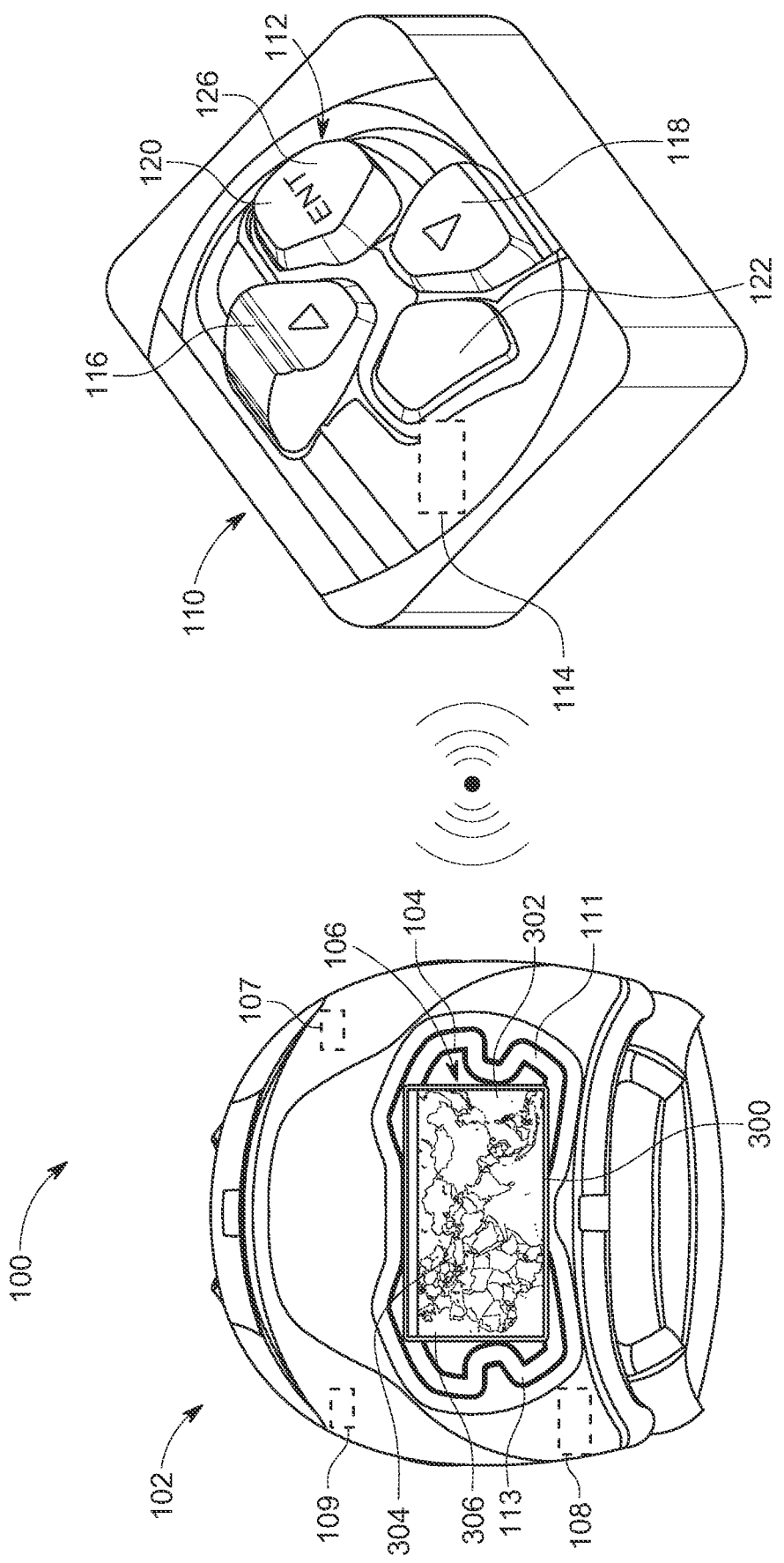
FIG. 2 is a perspective view of the helmet system of FIG. 1 depicting a rear of the helmet and a control device, in accordance with one embodiment of the present disclosure.

Referring to FIG. 1 and FIG. 2, a helmet system 100 for a saddle riding vehicle 200 is shown. The saddle riding vehicle 200 includes a frame 202 and a pair of wheels, for example, a front wheel 204 and a rear wheel 206, supporting the frame 202 on a ground and adapted to facilitate a movement of the saddle riding vehicle 200 on a road. To provide motive power to the pair of wheels 204, 206, the saddle riding vehicle 200 includes a power source 210, for example, an engine 212, supported on the frame 202, and a transmission 214 operatively coupling the power source 210 to the rear wheel 206 to control a torque and a speed transferred to the rear wheel 206 from the power source 210. Additionally, the saddle riding vehicle 200 includes a seat 220 mounted on the frame 202 to enable a seating of a pair of persons, for example, a driver and a pillion rider, on the saddle riding vehicle 200. Further, the saddle riding vehicle 200 includes a pair of turn indicator lights 222 arranged at a rear of the saddle riding vehicle 200 and configured to indicate a turning direction of the saddle riding vehicle 200. In an embodiment, the indicator lights act as turn signals when actuated by a person riding the saddle riding vehicle 200.

As shown in FIG. 2, the helmet system 100 of the saddle riding vehicle 200 includes a helmet 102 worn by the driver of the saddle riding vehicle 200 and configured to support/hold a mobile phone 300, for example, a smartphone 302. In an embodiment, the mobile phone 300 may be integrally attached to the helmet, and accordingly, the helmet system 100 may include the mobile phone 300. The mobile phone 300 is configured to display a map 304 of a route from an initial location to a destination to the pillion rider of the saddle riding vehicle 200.

To support/hold the mobile phone 300, the helmet 102 includes a holder 104, for example, a cavity 106 arranged/defined at rear of the helmet to enable the pillion rider to view a display 306 of the mobile phone 300 when the helmet 102 is worn by the driver of the saddle riding vehicle 200. In an embodiment, the holder 104 may include one or more retention structures (not shown) adapted to engage with the mobile phone 300 when arranged inside the cavity 106 to securely hold and retail the mobile phone 300 inside the cavity 106 and to prevent the disengagement of the mobile phone 300 from the helmet 102 during the movement of the saddle riding vehicle 200. Although a separate mobile phone 300 is shown and contemplated, it may be appreciated that the mobile phone 300 may be integral to the helmet 102.

In some embodiments, the helmet system 100 may include a communication device 108, for example, a short-range communication device, attached to the helmet 102 to enable a communication between the mobile phone 300 and a control device 110 of the helmet system 100 when the mobile phone 300 is attached/coupled/engaged to the holder 104. In some embodiments, the communication device 108 may be a Bluetooth™ device that facilitate a wireless data exchange between the control device 110 and the mobile phone 300 to enable the control and operation of the mobile phone 300 via the control device 110. In some embodiments, the communication device 108 may also enable the mobile phone 300 to communicate with a pair of first earphones (not shown) worn by the driver and a pair of second earphones (not shown) worn by the pillion rider such that the sound from the mobile 300 is transmitted to the earphones. In some embodiments, the communication device 108 may be inbuilt into the mobile phone 300, and is paired with the control device 110 and the earphones. In some embodiments, the helmet system 100 may include a speaker 109 (shown in FIG. 2) attached to the helmet 102 and configured to communicate with the mobile phone 300 such that sound from the mobile phone 300 is transmitted to the speaker 109. In some embodiments, the helmet system 100 may include a microphone 107 (shown in FIG. 1) adapted to be paired with the mobile phone 300 and/or the earphones of the pillion rider to enable communication between the driver and the pillion rider.

Further, in some embodiments, the helmet 102 may include at least one indicator, for example, a first indicator 111 and a second indicator 113 arranged at the rear of the helmet 102. The first indicator 111 is adapted to be actuated when a right turn signal of the saddle riding vehicle 200 is actuated by the driver, while the second indicator 113 is actuated when a left turn signal is actuated by the driver. Moreover, in some embodiments, both the first indicator 111 and the second indicator 113 are actuated when a brake of the saddle riding vehicle 200 is actuated/applied by the driver. In some embodiments, the indicators 111, 113 may be communicatively coupled to the mobile phone 300 and is actuated based on a location of the saddle riding vehicle 200 and an upcoming turn on a path of the travel of the vehicle 200 between the source station and the destination station. In such a case, a navigation module of the mobile phone 300 may determine a location of the vehicle 200 and access a map data related to the path of the vehicle 200 to determine an upcoming turn. The mobile phone 300 shares a control signal to the first indicator 111 or the second indicator 113 to actuate the first indicator 111 or the second indicator 113 based on the determined upcoming turn enroute of the vehicle 200. In some embodiments, an intensity and/or a color of the light of the indicators 111, 113 may be changed/selected based on a turn angle of the upcoming turn. For example, the color of the light of the first indicator 111 may be yellow when the upcoming turn is a sharp turn relative to a green when the upcoming turn is relatively wide turn. In some embodiments, instead of the actuation of the indicators 111, 113, the mobile phone 300 may depict/display one or more graphics or a message to indicate upcoming turn to the pillion rider. In some embodiments, the one or more graphics may show the pillion rider how to posture/position weight for the upcoming turn. In this manner, the helmet system 100 provides information about the turning and/or braking of the saddle riding vehicle 200. It may be appreciated that the communication device 108 facilitates the communication between the helmet system 100, the mobile phone 300 and the saddle riding vehicle 200. The communication device 108 facilitates communication between the indicators 111, 113 (i.e., the helmet system 100) and the saddle riding vehicle 200 and/or the mobile phone 300.

As shown, the control device 110 is adapted to communicate with the mobile phone 300 mounted/supported on the helmet 102. The control device 110 facilitates a user, for example, the pillion rider, of the saddle riding vehicle 200 to operate and control the mobile phone 300 mounted on the helmet 102 worn by the driver of the saddle riding vehicle 200. In an embodiment, as shown in FIG. 1, the control device 110 may be mounted to the vehicle 200. For example, the control device 110 may mounted to the frame 202 at a location proximate to a rear of the vehicle 200. In some embodiments, the control device 110 may be a hand-held device adapted to be held by the pillion rider of the saddle riding vehicle 200, and may include a user interface 112 to facilitate the pillion rider to input various commands to operate and control the mobile phone 300, and a transceiver 114 to enable the communication and data exchange between the control device 110 and the mobile phone 300. Accordingly, the control device 110 interacts with the mobile phone 300 via the communication device 108 and the transceiver 114. In some embodiments, the transceiver 114 may be a Bluetooth™ device.

In an embodiment, the user interface 112 may include a plurality of keys, for example, a first key 116, a second key 118, a third key 120, and a fourth key 122 adapted to be actuated/pressed by the pillion rider to control or operate various functions of the mobile phone 300 engaged with the helmet 102. In an embodiment, the first key 116 and the second key 118 may be up and down keys to enable the navigation the screen/display of the mobile phone 300 in an upward and downward direction. Similarly, the user interface 112 may include a left key and a right to navigate the display/screen in the left and right direction. Additionally, the third key 120 may be an enter key 126 to enable a selection one or more features of the display page shown on the screen/display of the mobile phone 300. Moreover, the user interface 112 may include a zoom key (not shown) to enlarge a portion of the display page.

Further, the user interface 112 may include a turn signal key, for example, the fourth key 122, to enable an actuate one of the pair of turn indicators lights 222 to indicate a turning of the saddle riding vehicle 200. The pillion rider may operate/press the fourth key 122 when the pillion receives an input from the mobile phone 300 for an upcoming turn during the travel of the saddle riding vehicle 200. For enabling the actuation of one of the turn indicator lights 222 in response to the actuation of the turn signal key, the control device 110 may be in communication with a controller 250, for example, ECU, of the saddle riding vehicle 200. The control device 100 may communicate with the controller 250 of the saddle riding vehicle 200 via the transceiver 114. In an embodiment, a left side turn indicator light 222 is actuated by pressing the fourth key 122 on the left side, while a right turn side indicator light 22 is actuated by pressing the fourth key 122 on the right side. However, it can be envisioned that the user interface 112 may include two separate keys to actuate the left side turn indicator light 222 and right side turn indicator light 222. In this manner, the helmet system 100 may enable the pillion rider to control the mobile phone 300 while sitting behind the driver of the saddle riding vehicle 200.

What is claimed is:

1. A helmet system for a saddle riding vehicle, the helmet system comprising:
    a helmet for a driver of the saddle riding vehicle and including a holder for retaining a mobile phone, wherein the holder is arranged at a rear of the helmet to provide a view of a display of the mobile phone retained by the holder; and
    a control device including a plurality of keys and adapted to be held and operated by a pillion rider of the saddle riding vehicle to:

communicate with the mobile phone to facilitate the pillion rider to operate and control the mobile phone in response to an actuation of at least one key of the plurality of keys, and communicate with a controller of the saddle riding vehicle to selectively actuate a pair of turn indicator lights of the saddle riding vehicle to indicate a turn of the saddle riding vehicle in response an actuation of at least one key of the plurality of keys when the pillion rider receives an input from the mobile phone for an upcoming turn.

2. The helmet system of claim 1, wherein the helmet includes a communication device configured to facilitate a communication of the mobile phone and the control device when the mobile phone is retained by the holder.

3. The helmet system of claim 2, wherein the communication device is a Bluetooth™ device.

4. The helmet system of claim 1, wherein the control device includes a user interface including the plurality of keys to enable the pillion rider to provide inputs to operate the mobile phone.

5. The helmet system of claim 1, wherein the plurality of keys includes a turn signal key adapted to actuate the pair of turn indicator lights of the saddle riding vehicle.

6. The helmet system of claim 1 further including a pair of indicators mounted to the helmet to indicate the upcoming turn to the pillion rider.

7. The helmet system of claim 6, wherein the pair of indicators are actuated in response to actuation of turn signals of the saddle riding vehicle.

8. The helmet system of claim 6, wherein the pair of indicators are actuated in response to a determination of the upcoming turn based on a location of the saddle riding vehicle.

9. The helmet system of claim 1, wherein the mobile phone is a smartphone configured to display a map of a route between a source station and a destination station.

10. A saddle riding vehicle, comprising:
a helmet for a driver of the saddle riding vehicle and including a holder for retaining a mobile phone, wherein the holder is arranged at a rear of the helmet to provide a view of a display of the mobile phone retained by the holder;
a pair of turn indicator lights arranged at a rear of the saddle riding vehicle and configured to indicate a turning direction of the saddle riding vehicle; and
a control device including a plurality of keys and adapted to be held and operated by a pillion rider of the saddle riding vehicle, wherein the control device is configured to:
communicate with the mobile phone to facilitate the pillion rider to operate and control the mobile phone in response to an actuation of at least one key of the plurality of keys, and
communicate with a controller of the saddle riding vehicle to selectively actuate the pair of turn indicator lights of the saddle riding vehicle to indicate a turn of the saddle riding vehicle in response an actuation of at least one key of the plurality of keys when the pillion rider receives an input from the mobile phone for an upcoming turn.

11. The saddle riding vehicle of claim 10, wherein the helmet includes a communication device configured to facilitate a communication between the mobile phone and the control device when the mobile phone is retained by the holder.

12. The saddle riding vehicle of claim 10, wherein the control device includes a user interface including the plurality of keys to enable the pillion rider to provide inputs to operate the mobile phone.

13. The saddle riding vehicle of claim 12, wherein the plurality of keys includes a turn signal key adapted to actuate the pair of turn indicator lights based on the inputs from the pillion rider.

14. The saddle riding vehicle of claim 10, wherein the control device is mounted to a frame of the saddle riding vehicle.

15. The saddle riding vehicle of claim 10 further including a pair of indicators mounted to the helmet to indicate the upcoming turn to the pillion rider.

16. The saddle riding vehicle of claim 15, wherein the pair of indicators are actuated in response to a determination of the upcoming turn based on a location of the saddle riding vehicle.

17. A helmet system for a saddle riding vehicle, the helmet system, comprising:
a helmet for a driver of the saddle riding vehicle and including a holder arranged at a rear of the helmet, the helmet including a pair of indicators;
a mobile phone coupled to the holder and communicatively coupled to the pair of indicators, wherein the mobile phone is configured to:
determine an upcoming turn by accessing a map data, and
change at least one of an intensity or a color of a light of at least one of the pair of indicators based on a turn angle of the upcoming turn; and
a control device adapted to be held by a pillion rider of the saddle riding vehicle and including a user interface having a plurality of keys to:
communicate with the mobile phone to facilitate the pillion rider to operate and control the mobile phone in response to an actuation of at least one key of the plurality of keys, and
communicate with a controller of the saddle riding vehicle to selectively actuate a pair of turn indicator lights of the saddle riding vehicle to indicate a turn of the saddle riding vehicle in response an actuation of at least one key of the plurality of keys when the pillion rider receives an input from the mobile phone for the upcoming turn.

18. The helmet system of claim 17, wherein the pair of indicators mounted to the helmet indicate an upcoming turn to the pillion rider.

19. The helmet system of claim 17, wherein the mobile phone is configured to determine the upcoming turn based on a location of the saddle riding vehicle and configured to actuate the pair of indicators in response to a determination of an upcoming turn based on the location of the saddle riding vehicle.

20. The helmet system of claim 17, wherein the plurality of keys includes a turn signal key adapted to actuate the pair of turn indicator lights of the saddle riding vehicle.

* * * * *